(12) United States Patent
Hereford et al.

(10) Patent No.: US 7,395,218 B2
(45) Date of Patent: Jul. 1, 2008

(54) METHODS AND SYSTEMS FOR INSURING AN ENTITY'S EXPOSURE TO LIABILITY

(76) Inventors: Fonda A. Hereford, 59 Clermont La., St. Louis, MO (US) 63124; Stephen J. Hall, 18 S. McKnight Rd., St. Louis, MO (US) 63124

(*) Notice: Subject to any disclaimer, the term of this patent is extended or adjusted under 35 U.S.C. 154(b) by 1489 days.

(21) Appl. No.: 09/798,182

(22) Filed: Mar. 2, 2001

(65) Prior Publication Data
US 2002/0123910 A1 Sep. 5, 2002

(51) Int. Cl.
*G06Q 40/00* (2006.01)
(52) U.S. Cl. .......................... 705/4; 705/35
(58) Field of Classification Search .............. 705/4
See application file for complete search history.

(56) References Cited

U.S. PATENT DOCUMENTS 6,138,102 A * 10/2000 Hinckley, Jr. ............. 705/36 R
6,347,302 B1 * 2/2002 Joao ......................... 705/36 R

OTHER PUBLICATIONS

Clapp, Jr.,Wallace "Insurers Carve Niche for Golf Course Programs," Jun. 1994, Rough Notes, vol. 137, No. 6, p. 30 (5 pages).*
McAuliffe, Don; "Murrietta, Calif, Calif. Gym Organizers Distribute Refund Checks," Jul. 29, 2000, Knight-Ridder Tribune Business News.*

* cited by examiner

*Primary Examiner*—C. Luke Gilligan
*Assistant Examiner*—Rachel L. Porter
(74) *Attorney, Agent, or Firm*—Armstrong Teasdale LLP

(57) ABSTRACT

A method for insuring an entity's exposure to liability created when a member resigns from the entity includes receiving information pertaining to an entity and a member, receiving information pertaining to the initiation fee, and processing the received information to track premium, coverage and claims relating to the initiation fee of the member. A system for implementing an insurance program for an entity's initiation fees includes at least one user device and a server connected to the user device. The server is configured to receive, via the at least one user device, information pertaining to an initiation fee insurance program. The server is also configured to process the received information and transmit information to the user device regarding whether the initiation fee insurance application has been accepted or rejected.

24 Claims, 21 Drawing Sheets

| | Named Insured Detail | Named Insured Contact Detail | Insured Club Detail | Insured Club Contact Detail | Enrollee Detail | Application Forms | Benefit Forms | Financial Transactions | Security Assignment |
|---|---|---|---|---|---|---|---|---|---|
| Insurance Broker Administrator | X | X | X | X | X | X | X | | X |
| INSURER Administrator | X | X | X | X | X | X | X | | |
| Account Manager | X | X | X | X | X | | | | |
| Named Insured Contact | | | | X | X | X | X | X | |
| Insured Club Contact | | | | | X | X | X | X | |
| Benefits Administrator | X | X | X | X | X | X | X | | |
| Financial Administrator | X | X | X | X | X | X | X | X | |

| | Home | Applications | Claims | Profiles | Reports | O&M |

Please fill in the following application form to submit a new named insured.

Named Insured

Mailing Address          City          State [IL] Zip

Location Address (if different)     City     State [IL] Zip

General Manager Name          GM's Phone

Contact Person (if different)     Contact's Phone

Main Phone #          FAX #

E-mail Address

Years in Business

| Types of Club | Number of Each Club | Total Memberships | Average Age of Member |
|---|---|---|---|
| Golf | 120 | 36000 | 56 |
| Tennis | 85 | 17253 | 59 |
| Golf & Tennis | 60 | 23000 | 52 |
| Country | 23 | 10324 | 68 |

Submit   Clear Form 214   216

| Insured Club Member | Invoice # Type | Invoice Date | Amount per Individual | Payment Received |
|---|---|---|---|---|
| ABC Golf Club | 1234-6798-998 | 01/01/01 | $ 7,500.00 | ☐ |
| Tom Jones | Premium | | $ 2,500.00 | ☐ |
| Tina Smith | Premium | | $ 2,500.00 | ☐ |
| Carl Oats | Premium | | $ 2,500.00 | ☐ |
| Journey Golf Club | 1234-6798-999 | 01/01/01 | $ 7,500.00 | ☐ |
| Tom Carle | Premium | | $ 2,500.00 | ☐ |
| Jim Leader | Installment | | $ 1,250.00 | ☐ |
| Al Freeze | Premium | | $ 2,500.00 | ☐ |
| Windam Golf Club | 1234-6799-0001 | 01/12/01 | $10,000.00 | ☐ |
| | Deposit Premium | | | |

METHODS AND SYSTEMS FOR INSURING AN ENTITY'S EXPOSURE TO LIABILITY

BACKGROUND OF THE INVENTION

This invention relates generally to insurance programs and, more particularly, to methods and systems for insuring exposure to liability created for an entity by the resignation of a member.

Many people desire to find a comfortable location to enjoy a relaxed lifestyle while having access to multiple amenities. In addition, many families enjoy spending time with people that have similar life styles, hobbies, and preferences. In addition, some people enjoy a certain activity so much, that they prefer to join a club to have access to such activities on a frequent basis.

Generally, in order to join such clubs, a person or family pays an initiation fee and annual or monthly dues. While the initiation fees are important to the club since they are used primarily for capital expenditure (golf course improvements, swimming pool, club house), the dues are used for operations such as salaries, restaurant and bar operations, daily maintenance and retail opportunities. Many clubs have one of two types of refundable initiation fee programs. The first type of program is for equity clubs where, once a requisite number of memberships to the club has been sold, a refund is paid to the resigned member, in the order of resignation, as each new membership is sold. Typically the amount paid is a percentage of the then current initiation fee. The resigning member is typically required to continue paying the monthly dues until the resigning member is replaced by a new member. The second type of program is for initiation deposit program clubs where the initiation fee is a deposit, i.e., a tax-free, no interest loan from the member. For a resigned member to recover the initiation deposit, the club membership must be full. The resigning member will then be repaid when a new member joins based on the resigning member's place on the resigned member list. Alternatively, if the club never achieves full membership, the resigning member is repaid no later than 30 years from the date the membership was first sold. Finally, there are many private clubs that offer no refundability of initiation fees at all.

Prospective club members are typically concerned that if they must leave a club for an unforeseen reason, they will not have the ability to retrieve all or a portion of the initiation fee. This potential lack of prompt payback of the initiation fee is a deterrent to new people joining clubs. It is therefore desirable to enable a club member to obtain at least a portion of their initiation fee upon resigning from the club in a reasonable amount of time.

BRIEF SUMMARY OF THE INVENTION

In an exemplary embodiment of the invention, a method for insuring initiation fees includes receiving information pertaining to an entity and a member, receiving information pertaining to the initiation fee, and processing the received information to allow the insured entities to remit premiums and track coverage details. A system utilized to implement an insurance program for insuring initiation fees includes at least one user device and a server connected to the user device. The server is configured to receive, via the at least one user device, information pertaining to an initiation fee insurance program. The server is also configured to process the received information and transmit information to the user device regarding whether the initiation fee insurance application has been accepted or rejected.

BRIEF DESCRIPTION OF THE DRAWINGS

FIG. 6 is a matrix detailing the access the business entities shown in FIG. 5 have to various pages of the web site;

FIG. 9 is an exemplary embodiment of a named insured application page;

FIG. 10 is an exemplary embodiment of a club application page;

FIG. 12 is an exemplary embodiment of an outstanding invoices page;

FIG. 14 is an exemplary embodiment of a claim application page;

FIG. 16 is an exemplary embodiment of a named insured profile page;

FIG. 17 is an exemplary embodiment of a named insured contact profile page;

FIG. 18 is an exemplary embodiment of an insured club profile page;

FIG. 19 is an exemplary embodiment of an insured club contact profile page;

FIG. 20 is an exemplary embodiment of a member profile page; and

DETAILED DESCRIPTION OF THE INVENTION

Figure 1:
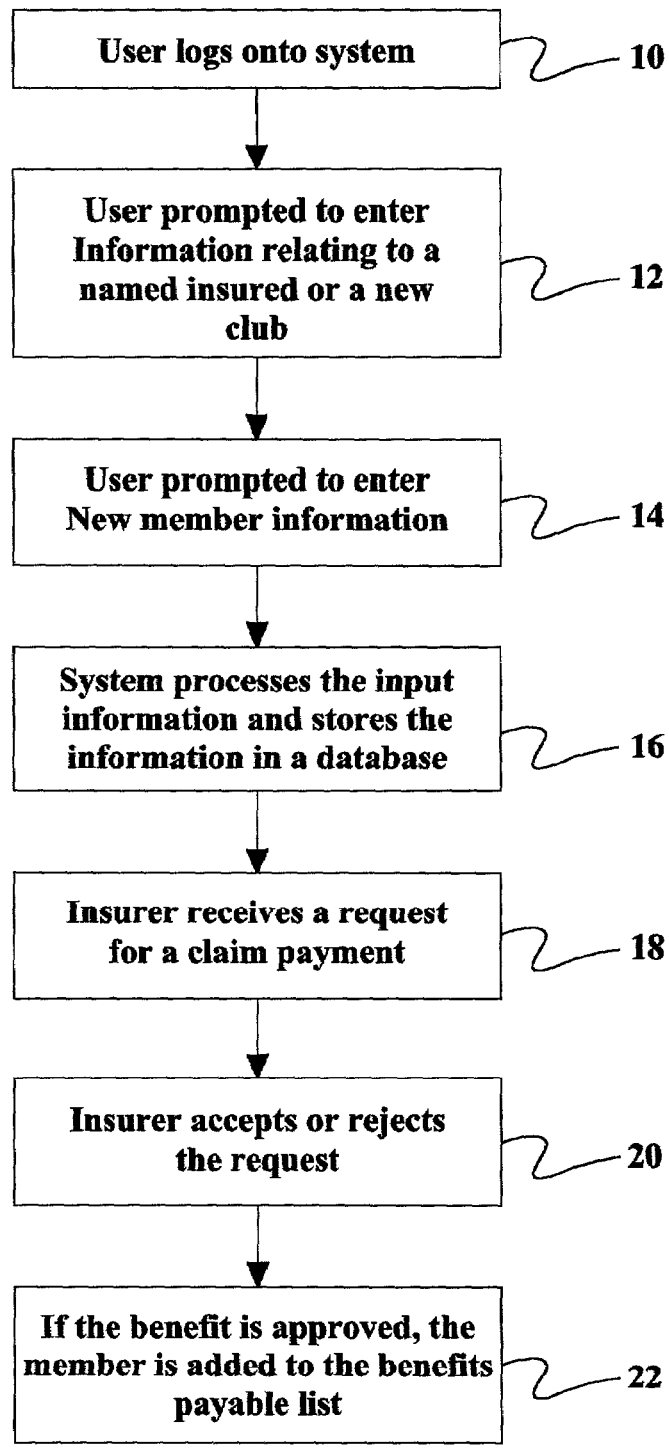
FIG. 1 is a flow chart illustrating process steps for providing insurance coverage to a club that protects the club from its liability created when a member resigns.

Set forth below is a description of exemplary methods and systems for providing insurance for club membership fees. While the methods and systems are sometimes described in the context of private clubs, the methods and systems are not limited to practice in connection with only private clubs. Rather, the methods and systems are applicable to any club or club type service organization that charges an initiation fee.

In an exemplary embodiment of the invention, an insurance policy between a club and an insurance provider pays a benefit to the club to cover a loss of an initiation fee for a private club member due to the member resigning from the club for one of a selected number of reasons, such as geographical relocation. In an alternative embodiment, an insurance policy between a club and an insurance provider benefits a club member for loss of an initiation fee due to the death or disability of the member. In one embodiment, a geographical relocation is defined as a change from a current primary residence to another primary residence more than 150 miles from the original primary residence. Alternatively, the move may be more or less than 150 miles. Geographical relocation is one of two types, either employment related (named peril) or any type of move (all-risk).

In an exemplary scenario, a member joins a club on Apr. 1, 2001 and the club owns an insurance policy on the member's initiation fee. There is a waiting period, during which time the club is not entitled to receive initiation fee insurance benefits for their resigning members. Although insurance coverage of the club begins on Apr. 1, 2001, the policy cannot be triggered until the expiration of the waiting period. Thus benefits are not payable unless the member resigns after the expiration of the waiting period. After that time, the club receives a settlement from the insurer if the club member terminates their membership for one of the covered reasons, If the club member leaves because of geographical relocation, then a portion of the initiation fee is paid back to the club for the benefit of the resigning member on a sliding scale for a selected number of years. If the club member terminates membership due to death, then the entire insurance benefit is paid to the beneficiary. In an alternative embodiment, if the beneficiary is a spouse, the club membership for the beneficiary is paid by the insurance proceeds for the life of the spouse.

In the exemplary embodiment, if the resigning club member leaves for geographical relocation, the club, for the benefit of the resigning member, is entitled to 80% of the initiation fee if the member resigns during the second year of membership, 70% of the initiation fee if the member resigns during the third year of membership, 60% of the initiation fee if the member resigns during the fourth year of membership, and 50% of the initiation fee if the member resigns during the fifth year of membership. The club receives no insurance benefit if the resigning member resigns after the end of the fifth year. Of course it should be understood that the above is exemplary only and is not to be considered limiting in any manner. The benefits could be structured in a number of ways such as having the term of insurance benefit extend beyond 5 years, having different amounts paid out, having the benefit cover the first year of membership, and having a waiting period more or less than one year.

FIG. 1 is a flow chart illustrating process steps for providing insurance coverage to a club that protects the club from loss of a portion of its liability created when a member resigns. An insurance policy process begins between an insurer and the club when a user logs 10 into the system and is prompted, via a display that prompts the user for inputs, to enter 12 information relating to a named insured or a new club. Further, the user is prompted to enter 14 information regarding a new member. The system processes 16 the input information and stores the information in a database. The system then has the capability of accessing the database and tracking members for claims purposes if the insurance policy is triggered. The insurer receives 18 a request for a claim payment and accepts 20 or rejects the request. If the benefit is approved, the member is added 22 to a benefits payable list.

Figure 3:
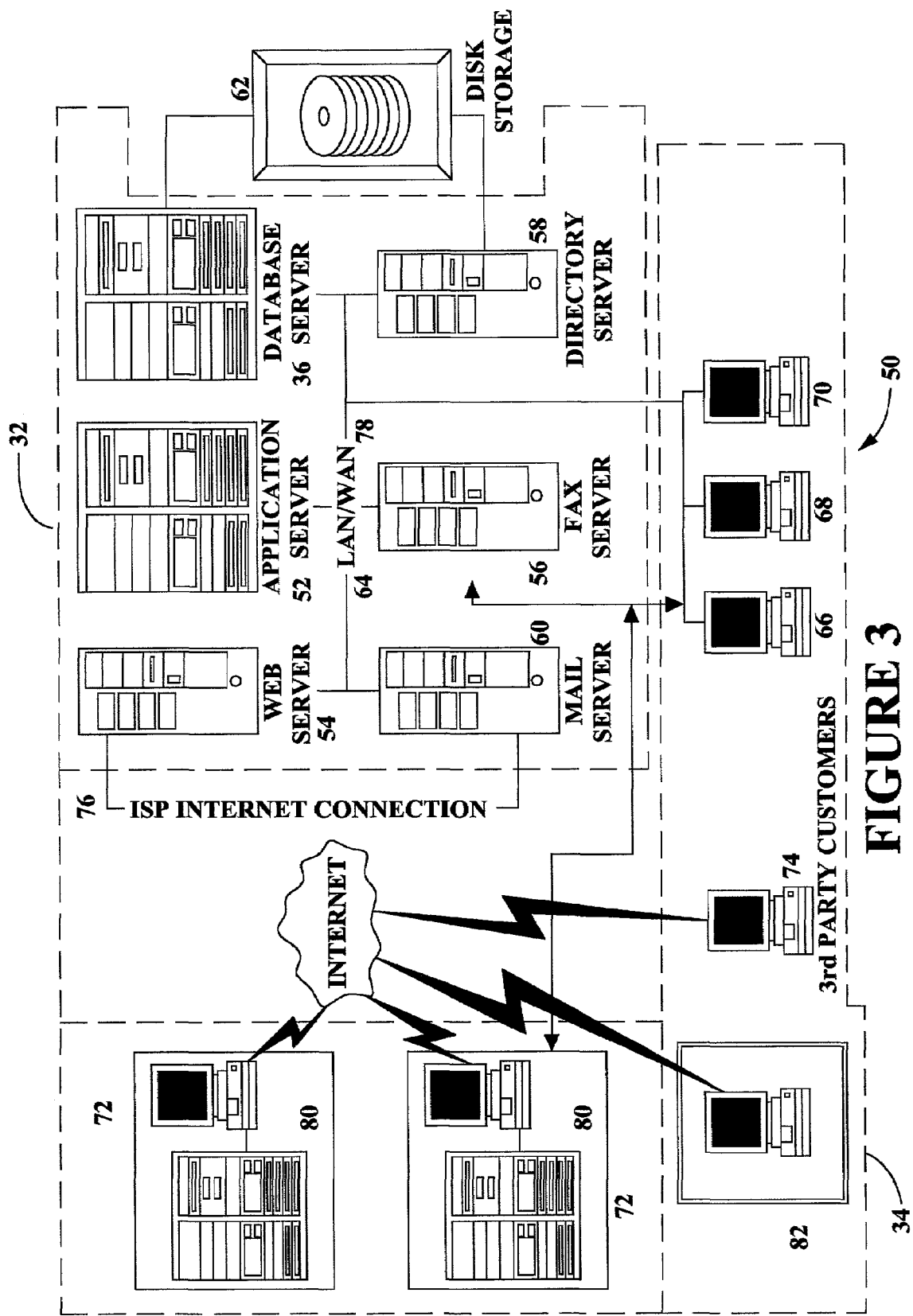
FIG. 3 is a block diagram of a server architecture for a network based system.
Figure 4:
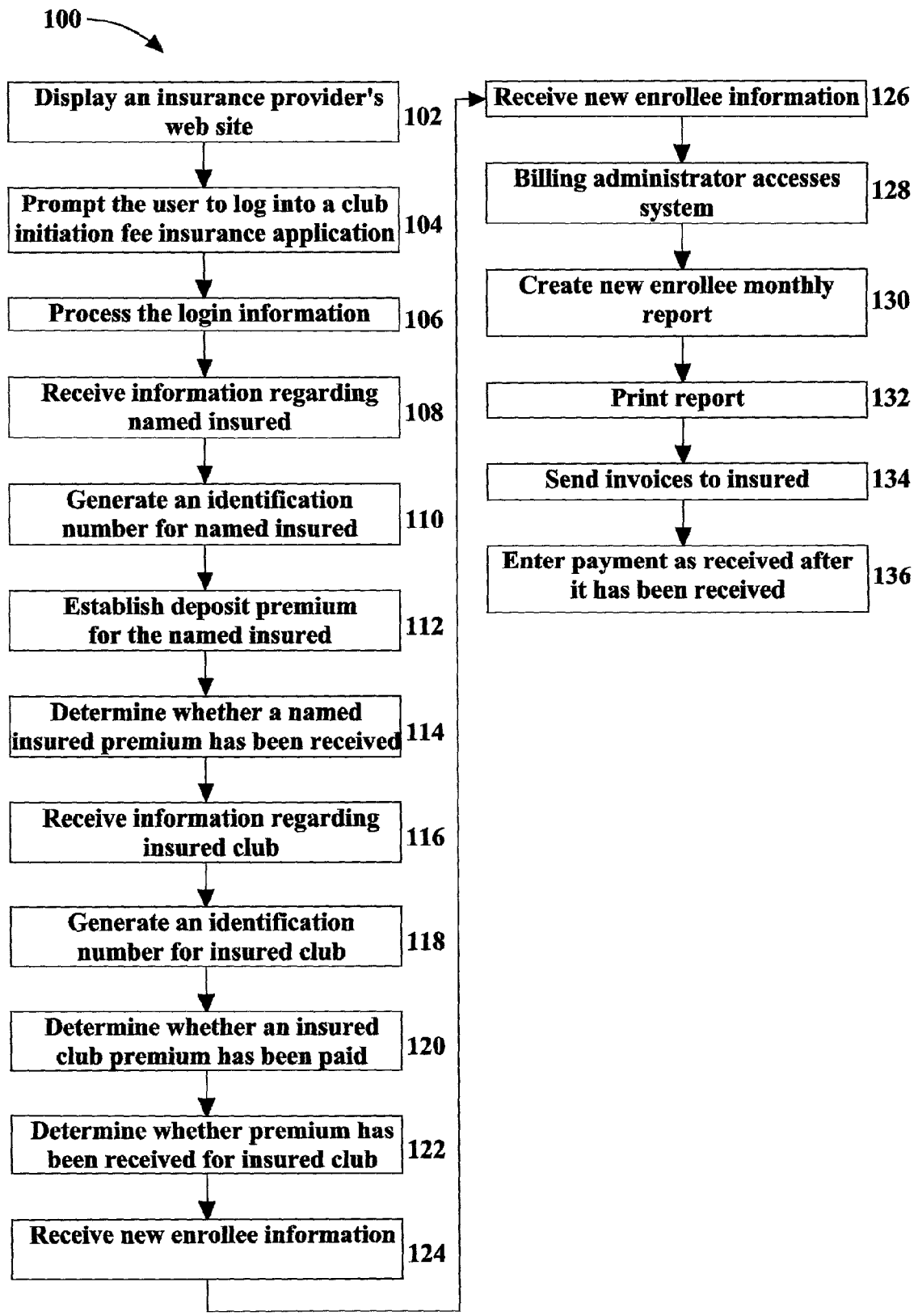
FIG. 4 is a flow chart illustrating process steps for providing insurance to clubs for club memberships.

Set forth below are details regarding exemplary hardware architectures (FIGS. 2 and 3) and an exemplary process flow chart illustrating information processing performed by the system (FIG. 4).

Figure 2:
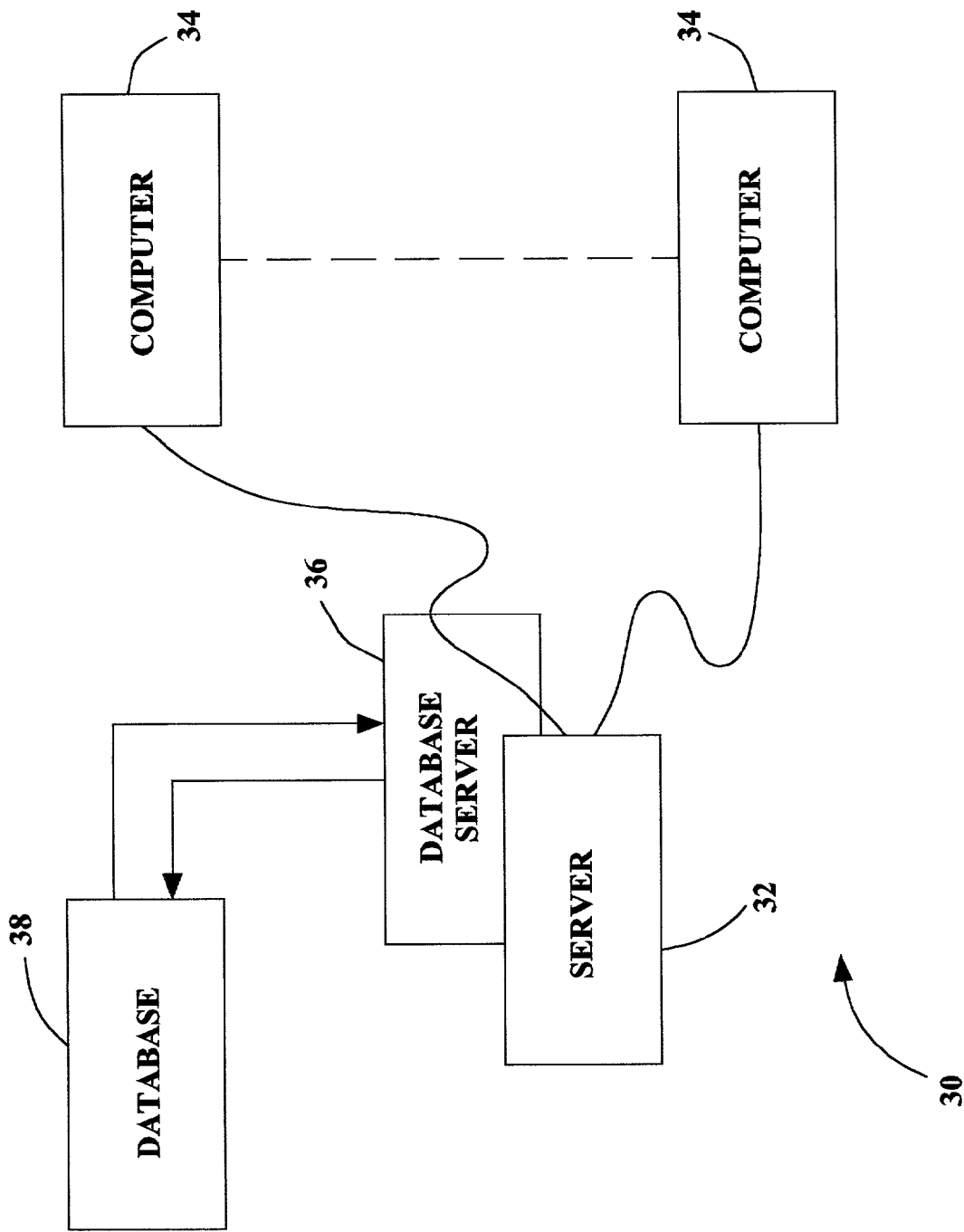
FIG. 2 is a simplified block diagram of a system in accordance with one embodiment of the invention.

FIG. 2 is a block diagram of a system 30 that includes a server sub-system 32, sometimes referred to herein as server 32, and a plurality of user devices 34 connected to server 32. In one embodiment, devices 34 are computers including a web browser, and server 32 is accessible to devices 34 via a network such as an intranet or a wide area network such as the Internet. In an alternative embodiment, devices 34 are servers for a network of customer devices.

Devices 34 are interconnected to the network, such as a local area network (LAN) or a wide area network (WAN), through many interfaces including dial-in-connections, cable modems and high-speed lines. Alternatively, devices 34 are any device capable of interconnecting to a network including a web-based phone, pager or other web-based connectable equipment. Server 32 includes a database server 36 connected to a centralized database 38. In one embodiment, centralized database 38 is stored on database server 36 and is accessed by users at one of customer devices 34 by logging onto server sub-system 32 through one of customer devices 34. In an alternative embodiment centralized database 38 is stored remotely from server 32.

FIG. 3 is a block diagram of a network based system 50 including server sub-system 32 and user devices 34. Server sub-system 32 includes database server 36, an application server 52, a web server 54, a fax server 56, a directory server 58, and a mail server 60. A disk storage unit 62 is coupled to database server 36 and directory server 58. Servers 36, 52, 54, 56, 58, and 60 are coupled in a local area network (LAN) 64. In addition, a system administrator work station 66, a work station 68, and a supervisor work station 70 are coupled to LAN 64. Alternatively, work stations 66, 68, and 70 are coupled to LAN 64 via an Internet link or are connected through an intranet.

Each work station 66, 68, and 70 is a personal computer including a web browser. Although the functions performed at the work stations typically are illustrated as being performed at respective work stations 66, 68, and 70, such functions can be performed at one of many personal computers coupled to LAN 64. Work stations 66, 68, and 70 are illustrated as being associated with separate functions only to facilitate an understanding of the different types of functions that can be performed by individuals having access to LAN 64.

Server sub-system 32 is configured to be communicatively coupled to various individuals or employees 72 and to third parties, e.g., customers, 74 via an ISP Internet connection 76. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 78, local area network 64 could be used in place of WAN 78.

In the exemplary embodiment, any employee 72 or customer 74 having a work station can access server sub-system 32. One of customer devices 34 includes a work station 80 located at a remote location. The work stations are personal computers including a web browser. Also, the work stations are configured to communicate with server sub-system 32. Furthermore, fax server 56 communicates with employees 72 and customers 74 located outside the business entity and any of the remotely located customer systems, including a customer system 82 via a telephone link. Fax server 56 is configured to communicate with other work stations 66, 68, and 70 as well.

In one specific exemplary embodiment, the following commercially available hardware and software are utilized: Web Server platform Windows NT 4.0 SP 5; Database Server platform Windows NT 4.0; Internet Information Server (IIS) 4.0; Microsoft Transaction Server (MTS); COM objects using VB 6.0 dlls; Active Server Pages 3.0; JScript 5.0; VBScript 5.0; and SQL Database 7.0. The extranet site operates under IE 4.0 and Netscape 4.0.

FIG. 4 is a flow chart illustrating process steps of a method 100 for enrolling in a club membership initiation fee insurance program. A system displays 102 on a user terminal an insurance provider's web site. The system, similar to system 30 shown in FIG. 1, prompts 104 the user to log into a club initiation fee insurance application. The system processes 106 the login information and either accepts the user login and transmits an application page to the user terminal, or rejects the user login and transmits the insurance provider's web site to the user terminal. In one embodiment, the user is an insurance broker administrator.

The system receives 108 information about a named insured from the user and stores the received information in a named insured database. The system reviews the received information and determines whether the information is complete and can be accepted or is incomplete and needs additional information for processing. Once the information is complete, the system generates 110 an identification number for the named insured. A deposit premium is established 112 for the named insured and the system determines 114 whether a premium has yet been received for the named insured. If a premium has been received, the financials are updated and the accounts payable is credited the deposit premium. If a premium has not yet been received, no financial transactions take place and an invoice is sent to the named insured.

The system receives 116 information about an insured club from the named insured and stores the received information in an insured club database. The system reviews the received information and determines whether the information is complete and can be accepted or is incomplete and needs to have additional information for processing. Once the information is complete, the system generates 118 an identification number for the insured club. A deposit premium is established 120 at this level if a policy is written against the club and the system determines 122 whether a premium has yet been received for the insured club. If a premium has been received, the financials are updated and the accounts payable is credited the deposit premium. If a premium has not yet been received, no financial transactions take place and an invoice is sent to the insured club.

The system also receives 124 information about a new club member from an insured entity contact and stores the received information in a new member database. The system reviews 126 the received information and determines whether the information is complete and can be accepted or is incomplete and needs additional information for processing. Once the information is complete, the system generates 126 an identification number for the new member. An invoice is then queued up for billing purposes.

In one embodiment, a premium is obtained from both the named insured and the insured club. In an alternative embodiment, a premium is obtained only from the named insured. In a further alternative embodiment, a premium is obtained only from the insured club. In a still further alternative embodiment, a premium is obtained from only a member.

A billing administrator accesses 128 the system and creates 130 a new member's monthly report. The report is printed 132 and invoices are sent 134 to the insured. Once payment is received, the payment is indicated 136 as being received, the application is updated, and the payment is sent to the insurer.

Figure 5:
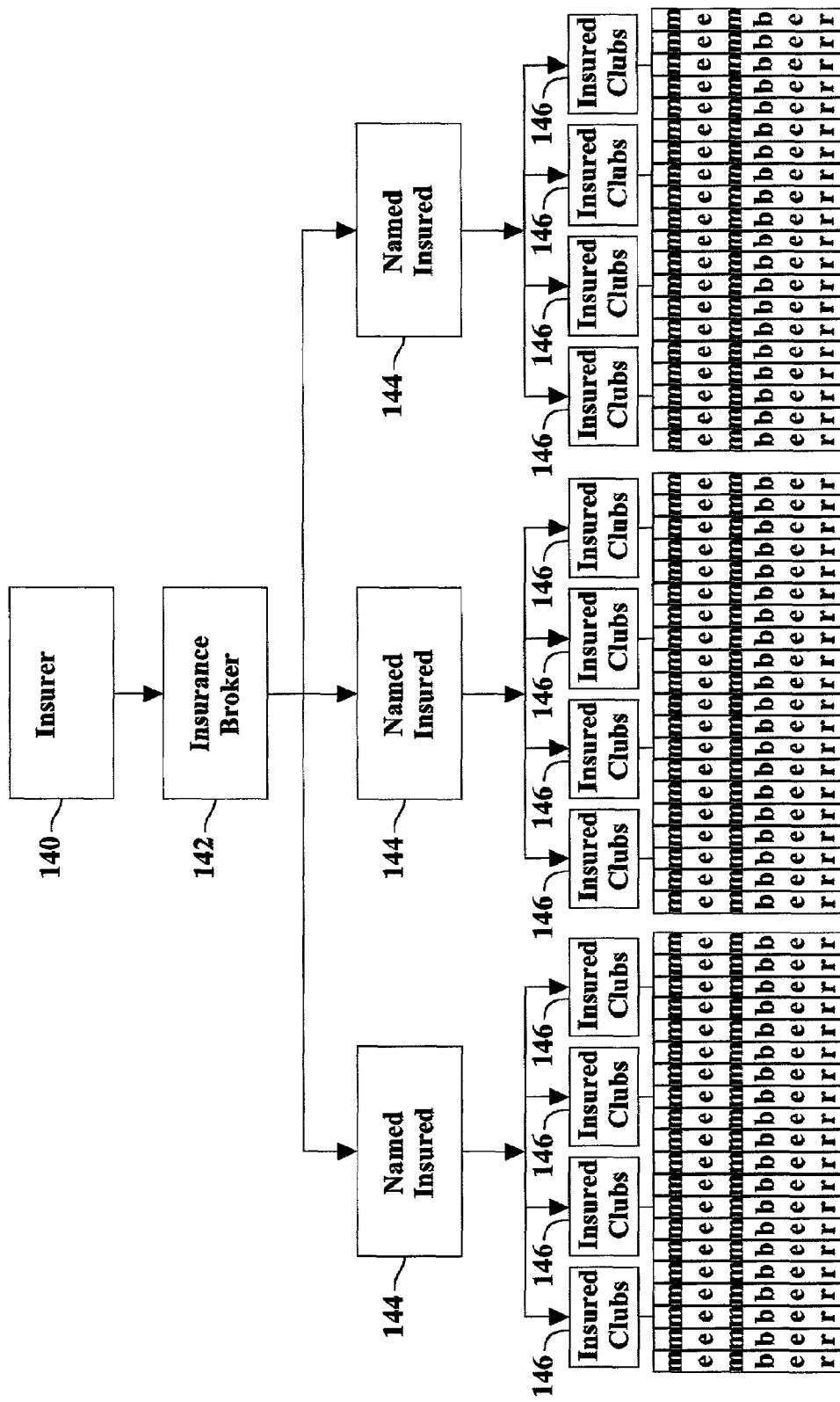
FIG. 5 is a block diagram that represents the hierarchy of the business structure utilized to provide the insurance for the club membership initiation fees.

FIG. 5 is a block diagram that represents the hierarchy of one embodiment of a business structure utilized to provide insurance for the club membership initiation fees. An insurer 140 offers a product through an insurance broker 142 to at least one named insured 144. Each named insured 144 offers the product to at least one insured club 146 which have a plurality of club members 148.

FIG. 6 is a matrix detailing the access each business entity described in FIG. 5 has to the various pages in the web site. Users access a web site and enter a user id and a password as describe below in detail. Security is enforced by controlling the access each user has to each of the various web site pages. The "X"s in the matrix shown in FIG. 6 depict an exemplary set of roles and portions of the site to which the respective user has read/write access to designated areas of the site.

Figure 7:
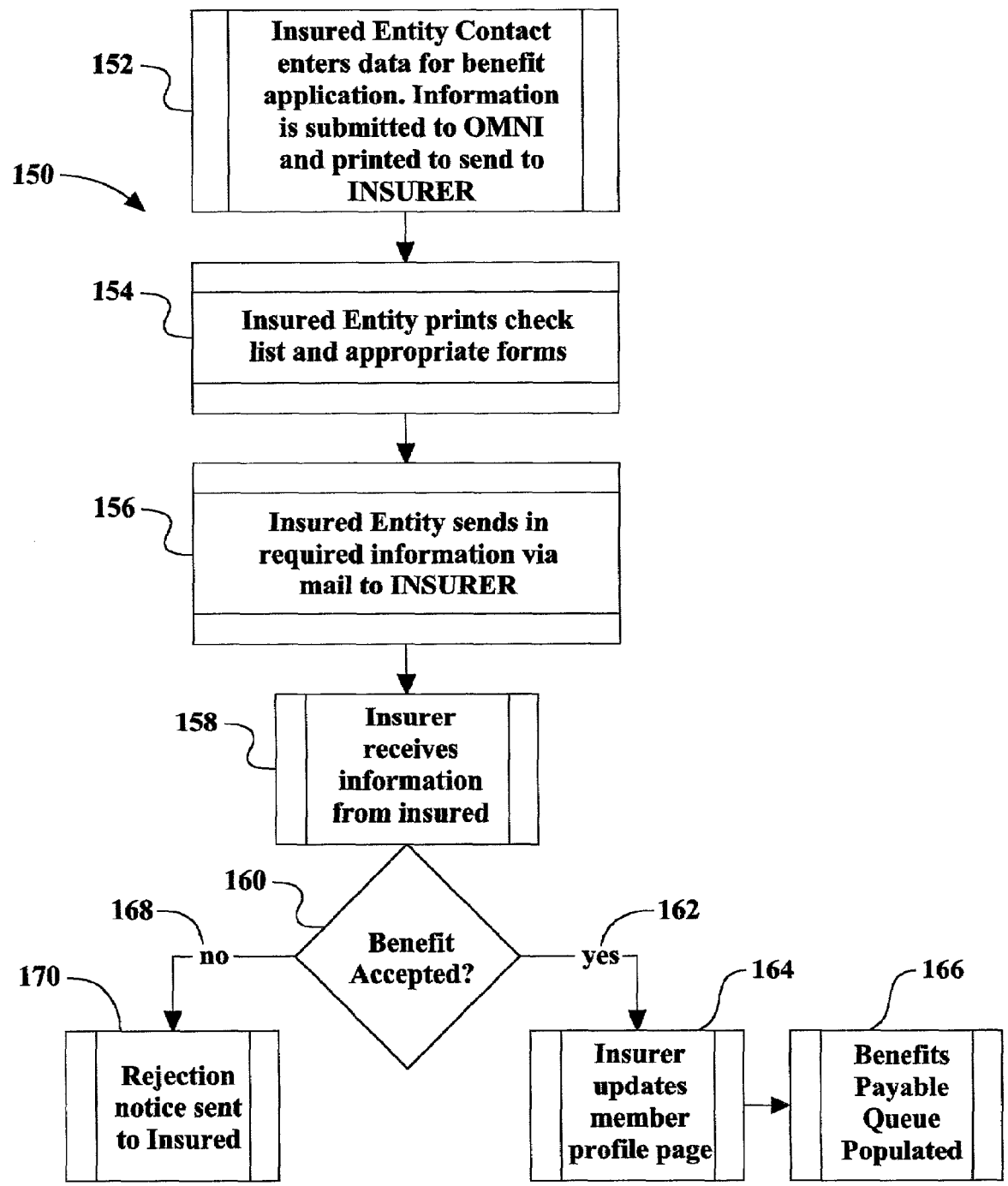
FIG. 7 is a method for processing claims related to a club membership initiation fee insurance program.

FIG. 7 is a method 150 for processing claims related to a club membership initiation fee insurance program. An insured entity contact enters 152 data for benefit application and the information is submitted to an insurance broker. The insured entity sends the information to the insurer. The insured entity obtains 154 the proper check list and the appropriate forms. The insured entity then sends 156 the required information to the insurer. Once the insurer receives 158 the pertinent information from the insured, a decision is made 160 regarding whether to accept the benefit. If the benefit is accepted 162, the insurer updates 164 the member profile page and the benefits payable queue is populated 166. If the benefit is not accepted 168, a rejection notice is sent 170 to the insured detailing the reasons why the benefit has been rejected.

In an exemplary embodiment, there are certain rules and actions that are followed by the system and the interested parties. The following is a description of some of these rules and actions that apply in the exemplary embodiment. The system generates the named insured identification numbers, the insured club identification numbers, and the member identification numbers. If the premium is less than or equal to $2,000 and the initiation fee is to be paid in full up front, full payment for the premium is due to the insurance broker. Clubs that do not make payments in full as described above will not be eligible for member's coverage.

If the initiation fee payment is staggered, payment of the insurance benefit is also staggered. For example, if the member pays the initiation fee in installments, the payment of the insurance benefit is pro-rated depending on the amount of the initiation fee paid by the member up to the time of resignation. Benefit checks will be issued and mailed to the insured. Benefits will be paid within 60 days of receiving all required documentation, and benefit payments will not offset account receivables. Benefit processing will occur outside the application. Benefits will be paid based on the resignation date or the move date, whichever is later. In an exemplary embodiment, payment of the benefits is: Year One 0%, Year 2 80% of the paid initiation fee returned, Year three 70% of the paid initiation fee returned, Year four 60% of the paid initiation fee returned, and Year five 50% of the paid initiation fee returned. The above description is exemplary only and is not meant to be limiting.

To implement the process described above, many variations of particular screens viewable by a customer can be utilized. The following description refers to one set of screens that can be used to prompt a customer to make the necessary inputs to enable the system to process the insurance related information. Of course, many variations of such screens are possible.

Figure 8:
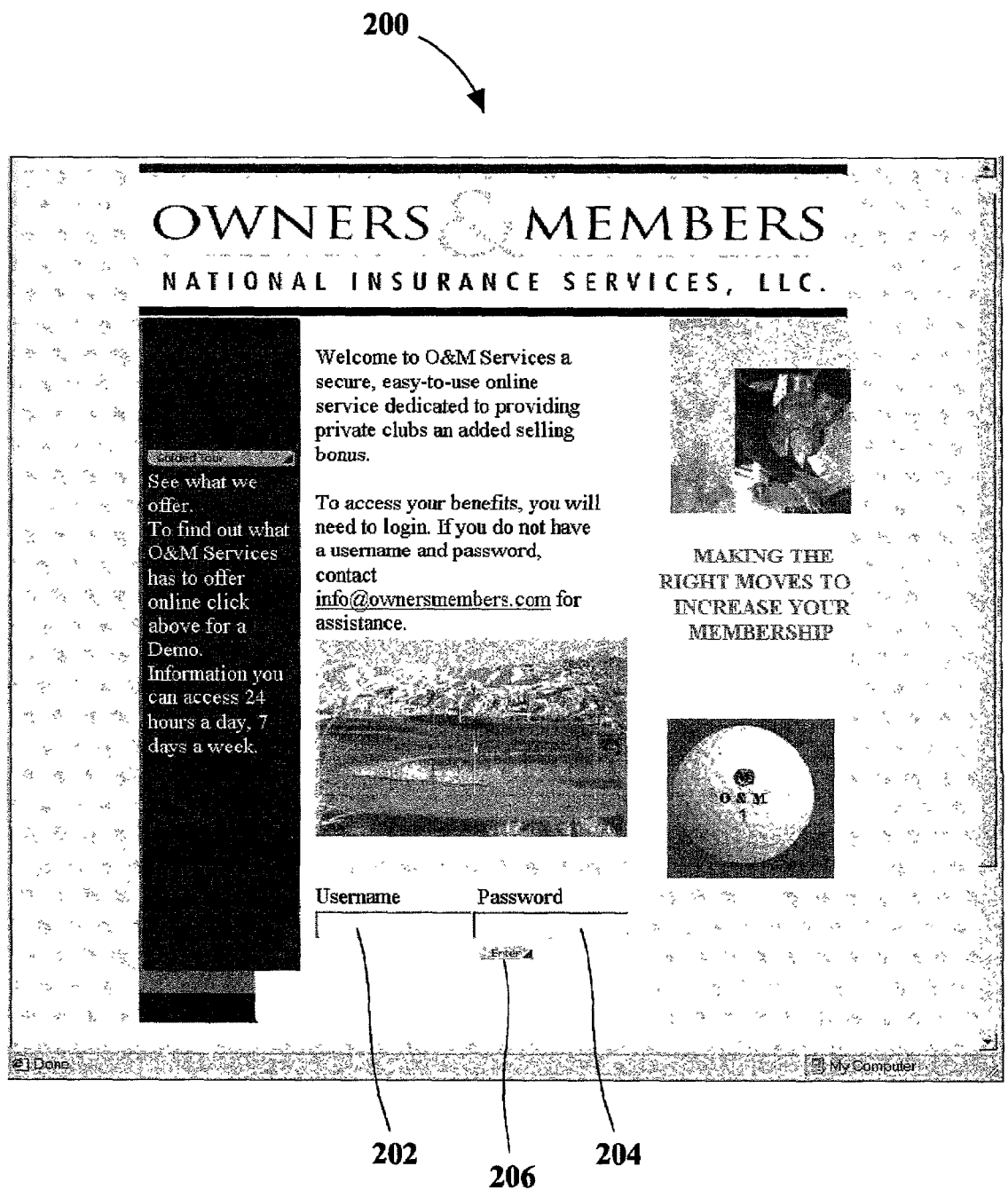
FIG. 8 is an exemplary embodiment of an insurance broker web site page.

FIG. 8 shows an exemplary embodiment of an insurance broker web site page, as depicted in screen shot 200, which a system, such as system 30 (shown in FIG. 2), displays to a user device, such as user device 34 (shown in FIG. 2). Screen shot 200 includes information blocks for a user name 202 and password 204. In use, a user accesses an insurance broker's home page and selects a login button (not shown) located on the home page. System 30 then transmits screen shot 200 to user device 34. The user enters the requested information and selects an enter button 206 to transmit the information to the system. If the information submitted by the user is not accepted by system 30, system 30 transmits the insurance broker's home page to user device 34.

FIG. 9 shows an exemplary embodiment of a named insured application page depicted as screen shot 210. Screen shot 210 is transmitted to user device 34 (show in FIG. 2) if the information submitted by the user on login page 200 is accepted by system 30. Named insured page 210 includes a number of information blocks 212 to be completed by an insurance broker administrator. In addition, screen shot 210 includes a submit button 214 to transmit the inputted information to system 30. Screen shot 210 also includes a clear form button 216 to clear any information entered into information blocks 212. After the information is submitted by the insurance broker administrator, system 30 either approves or disapproves the application. If the application is approved, system 30 generates an ID number and a deposit premium is established. If the premium has been received, the financials are updated and if the premium has not been received, an invoice is sent out.

Figure 10:
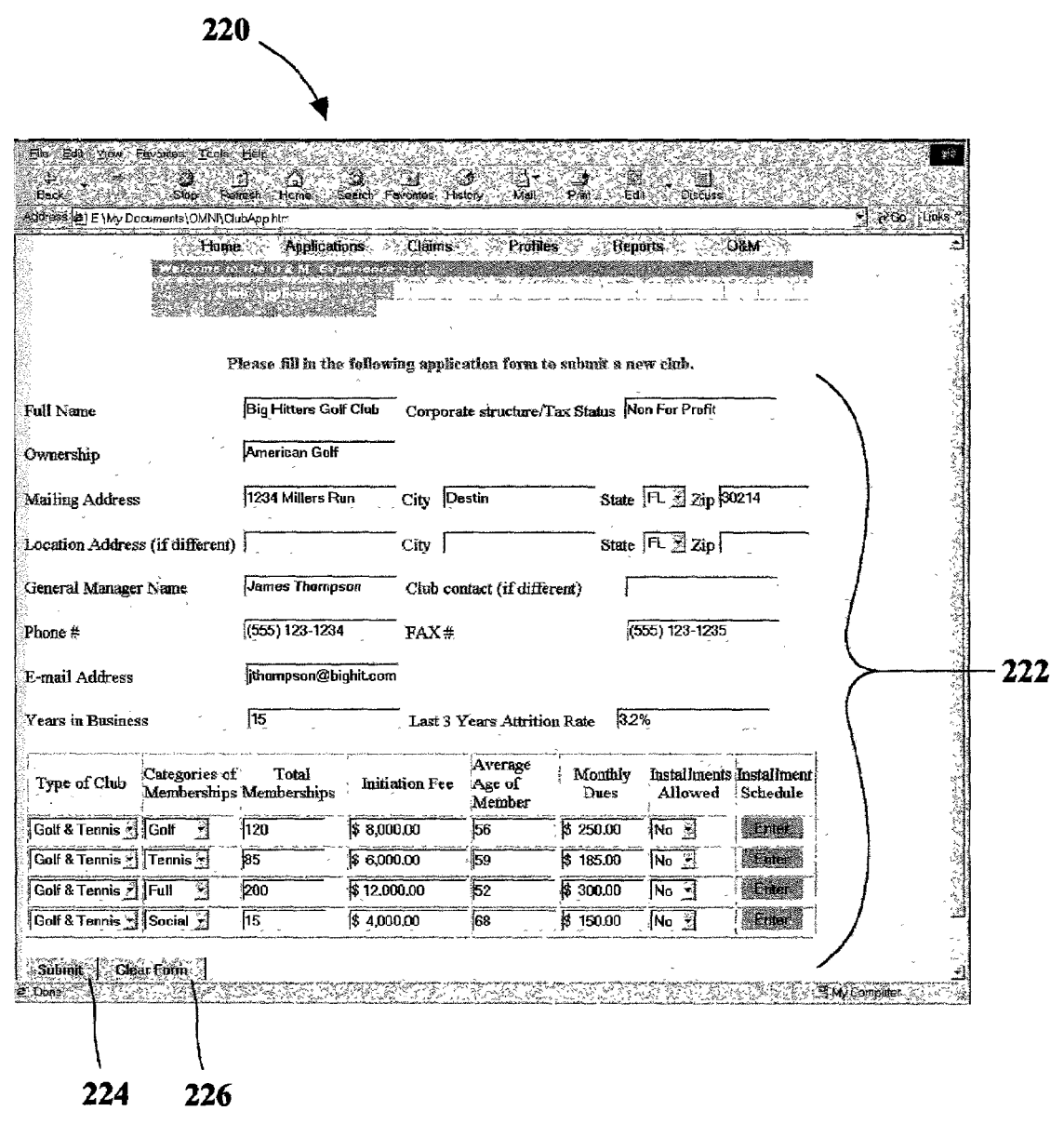

FIG. 10 shows an exemplary embodiment of a club application page depicted as screen shot 220. Club application screen shot 220 includes a number of information blocks 222 to be completed by a named insured. Alternatively, an insurance broker completes the information requested on screen shot 220. In addition, screen shot 220 includes a submit button 224 to transmit the inputted information to system 30. Screen shot 220 also includes a clear form button 226 to clear any information entered into information blocks 222. After the information is submitted by the named insured, system 30 either approves or disapproves the application. If the application is approved, system 30 generates an ID number and a deposit premium is established. If the premium has been received, the financials are updated and if the premium has not been received, an invoice is sent out.

Figure 11:
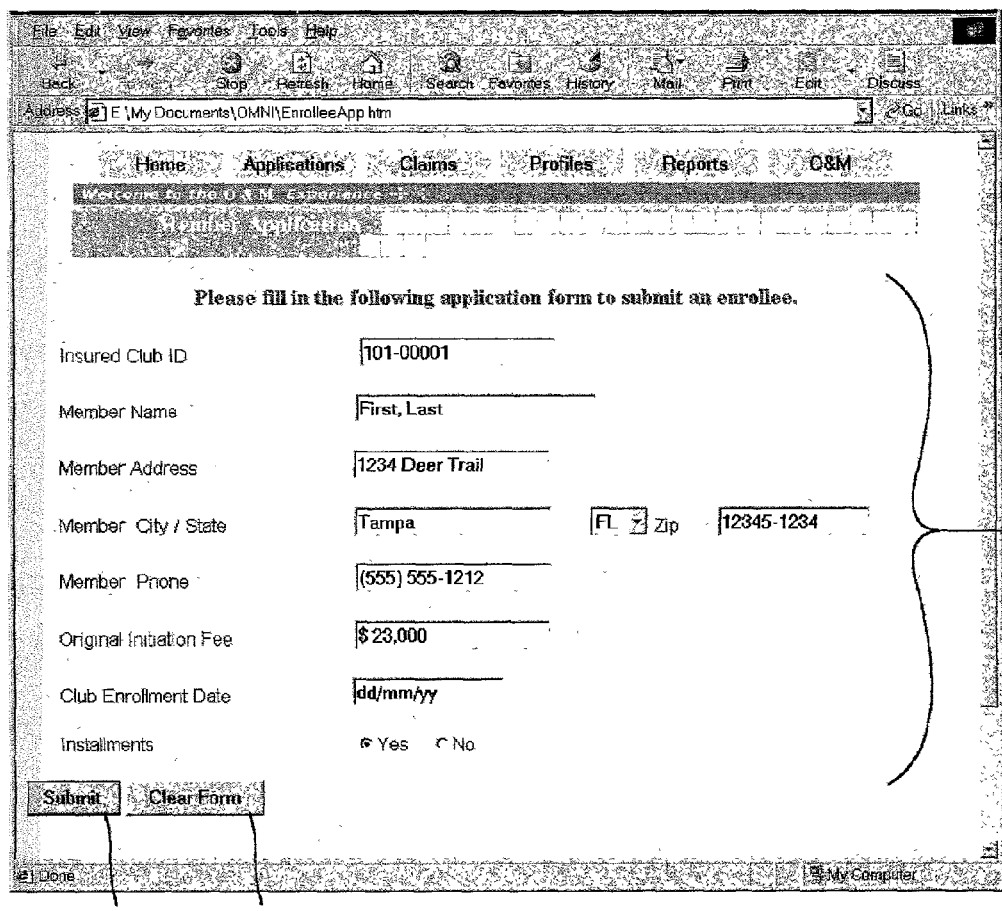
FIG. 11 is an exemplary embodiment of a member application page.

FIG. 11 shows an exemplary embodiment of a member application page depicted as screen shot 230. Member application screen shot 230 includes a number of information blocks 232 to be completed by an insured entity. In addition, screen shot 230 includes a submit button 234 to transmit the inputted information to system 30. Screen shot 230 also includes a clear form button 236 to clear any information entered into information blocks 232. After the information is submitted by the insured entity, system 30 either approves or disapproves the application. If the application is approved, system 30 generates an ID number and an invoice number is queued up for billing purposes.

FIG. 12 shows an exemplary embodiment of an outstanding invoices page depicted as screen shot 240. Outstanding invoices screen shot 240 includes a number of member entries 242 that lists the members, the insured club, the amount due, the invoice date, and the payment received. In addition, screen shot 240 includes a submit button 244 to transmit the inputted information to system 30. In one embodiment, screen shot 240 also includes a clear form button (not shown) to clear any information entered into information blocks 242. A billing administrator determines the number of new members that have been added for a selected period of time. System 30 (shown in FIG. 2) is used to create an invoice and the billing administrator sends the invoice to the insured once each preselected period. A collection administrator determines when payment is received and marks a box on each member entry line. Once payment is received, the application is updated and the payment is sent to the insurer.

Figure 13:
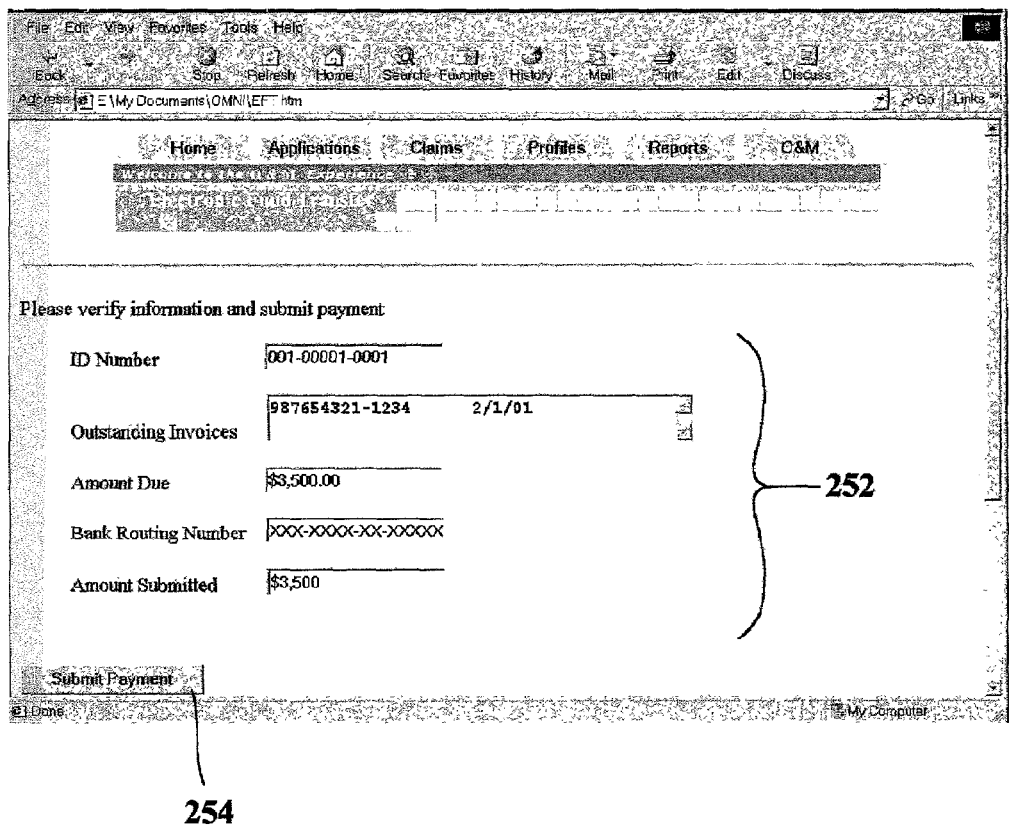
FIG. 13 is an exemplary embodiment of an electronic fund transfer page.

FIG. 13 shows an exemplary embodiment of an electronic fund transfer page depicted as screen shot 250. Screen shot 250 includes a number of information blocks 252 pertaining to payment specific information to be completed by the insured entity. In addition, screen shot 250 includes a submit payment button 254 to transmit the inputted information to system 30 (shown in FIG. 2). In one embodiment, screen shot 250 also includes a clear form button (not shown) to clear any information entered into information blocks 252. After the information is submitted by the insured entity, system 30 either accepts or rejects the application. If the information is accepted, system 30 updates outstanding invoice page (shown in screen shot 240) and the financial transactions take place.

Figure 14:
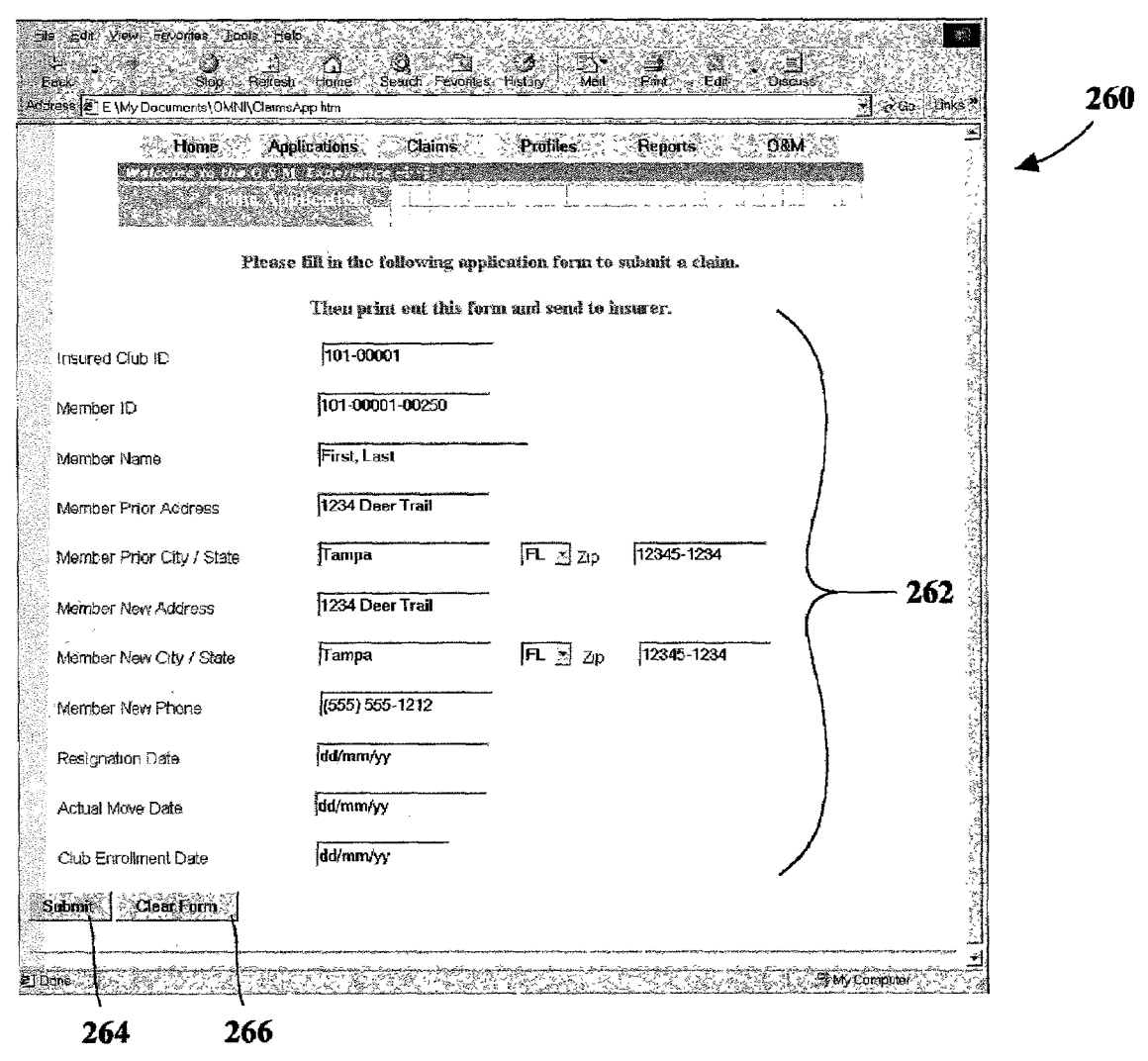

FIG. 14 is an exemplary embodiment of a Claim Application page depicted in screen shot 260. Screen shot 260 includes a number of information blocks 262 pertaining to benefit specific information to be completed by the club. In addition, screen shot 260 includes a submit button 264 to transmit the inputted information to system 30 (shown in FIG. 2). Screen shot 260 also includes a clear form button 266 to clear any information entered into information blocks 262. The insured prints the benefit form and sends the form to the insurer. In one embodiment, other required claims documents are also sent to the insurer. A notification of this transmission is sent to the insurance broker. The insurer reviews the documents and either accepts or rejects the benefit. If the benefit is accepted, system 30 updates the member information on the member information page, depicted in FIG. 9. The member is then entered into a benefits payable queue. If the benefit is rejected, a rejection letter is sent to the insured detailing reasons why the insured rejected the benefit.

Figure 15:
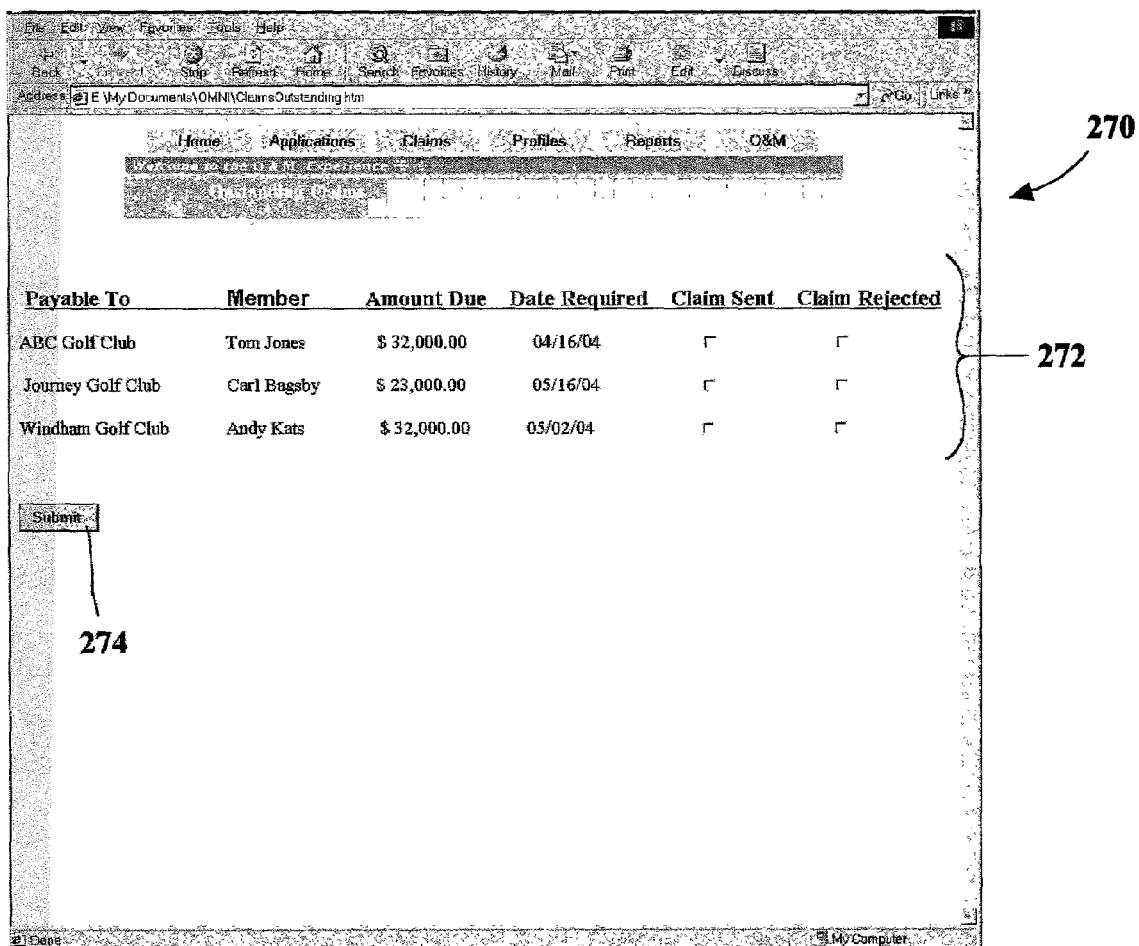
FIG. 15 is an exemplary embodiment of an outstanding claims page.

FIG. 15 is an exemplary embodiment of an outstanding claims page depicted in screen shot 270. Screen shot 270 includes a number of information blocks 272 utilized to determine whether a benefit has been sent to a member. Screen shot 270 also includes a submit button 274 to transmit the inputted information to system 30 (shown in FIG. 2). In one embodiment, screen shot 270 includes a clear form button (not shown) to clear any information entered into information blocks 272. After the information is submitted with a payment sent box checked, system 30 is updated with the proper information.

Figure 16:
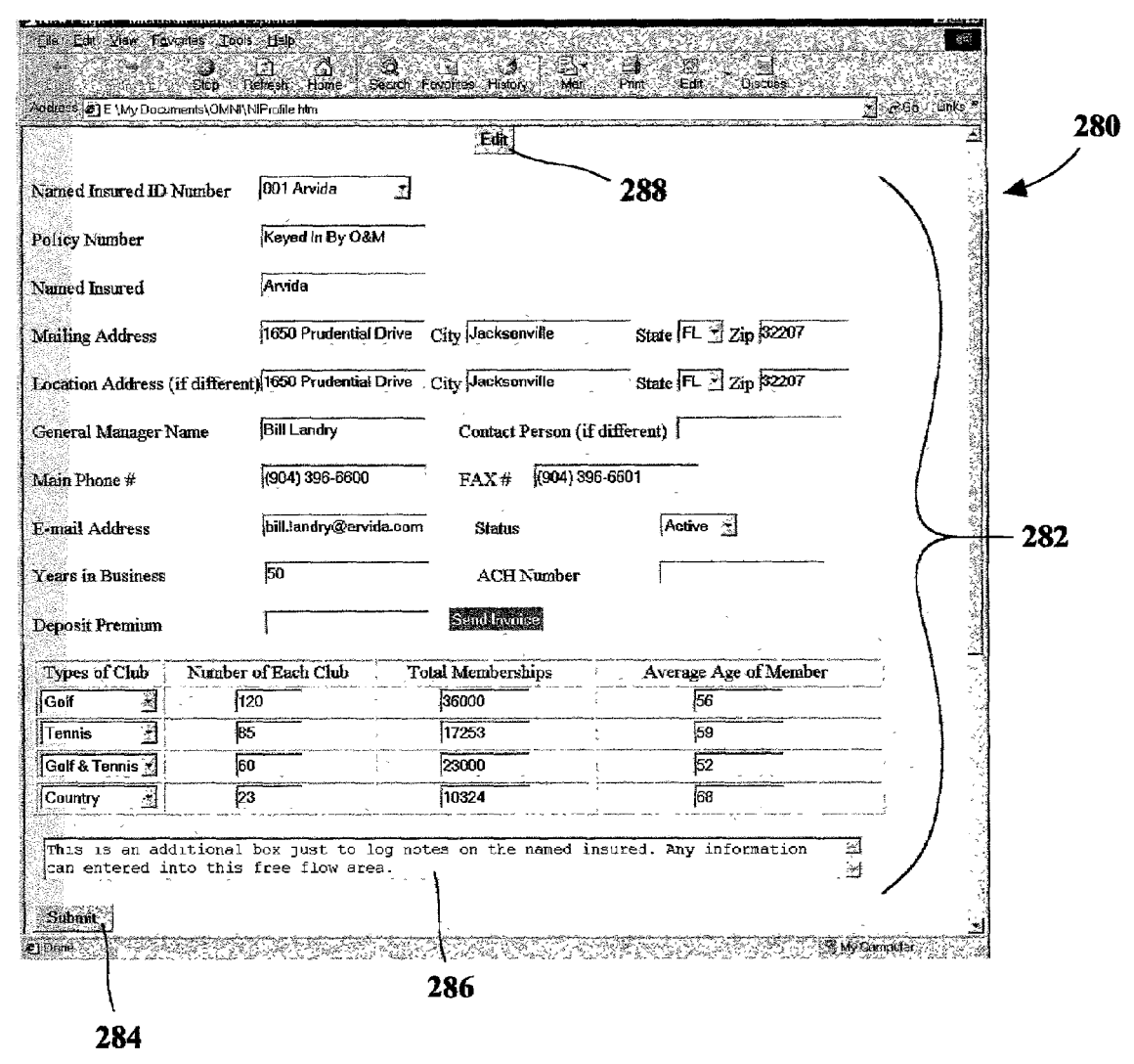

FIG. 16 is an exemplary embodiment of a named insured profile page depicted in screen shot 280. Screen shot 280 includes a number of information blocks 282 utilized to document the named insured. The named insured profile information is entered and maintained in a database by Administrators or account managers. Screen shot 280 also includes a submit button 284 to transmit the inputted information to system 30 (shown in FIG. 2). Screen shot 280 also includes a comment box 286 used to provide comments and notes regarding the named insured profile information. Screen shot 280 further includes an edit button 288 utilized to edit a named insured profile page that has previously been completed and sent to system 30 (shown in FIG. 2).

Figure 17:
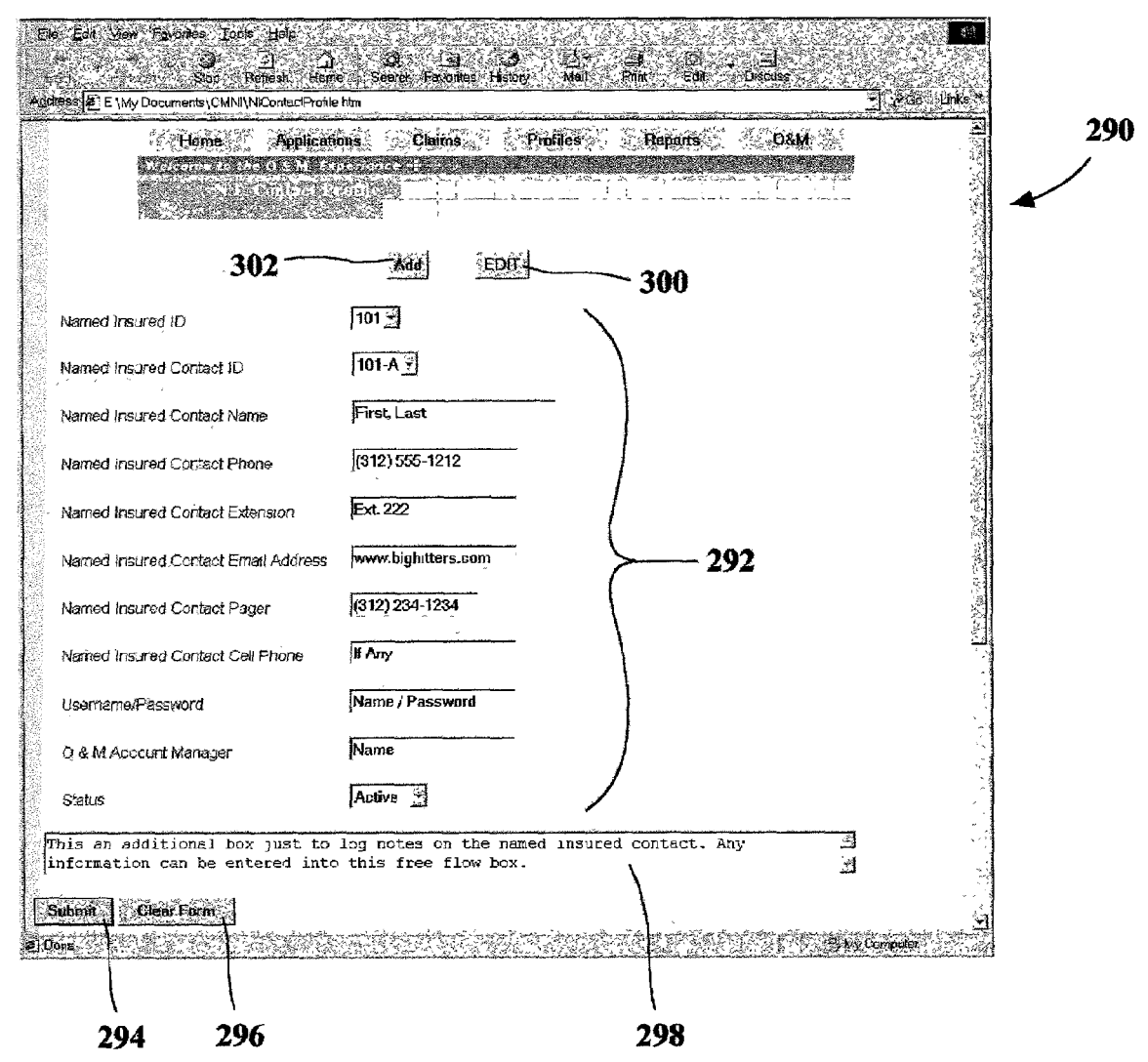

FIG. 17 is an exemplary embodiment of a named insured contact profile page depicted in screen shot 290. Screen shot 290 includes a number of information blocks 292 utilized to document the named insured contact. The named insured contact information is entered and maintained in a database by Administrators or account managers. Screen shot 290 also includes a submit button 294 to transmit the inputted information to system 30 (shown in FIG. 2). Screen shot 290 also includes a clear form button 296 to clear any information entered into information blocks 292. Screen shot 290 further includes a comment box 298 used to provide comments and notes regarding the named insured contact. Screen shot 290 further includes an edit button 300 utilized to edit a named insured contact detail page that has previously been completed and sent to system 30 (shown in FIG. 2). Screen shot 290 still further includes an add button 302 utilized to add another named insured contact page for an existing named insured.

Figure 18:
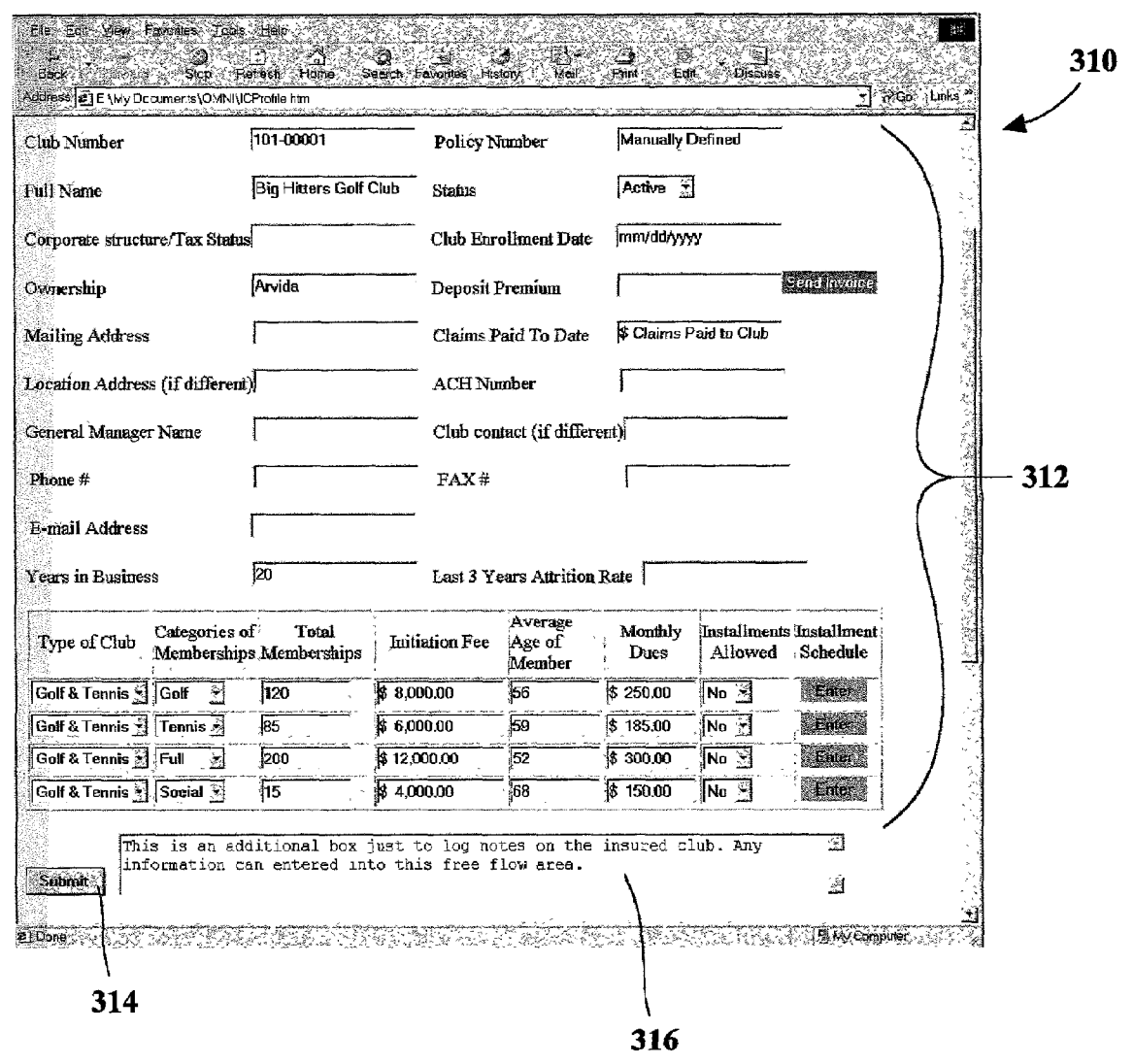

FIG. 18 is an exemplary embodiment of an insured club profile page depicted in screen shot 310. Screen shot 310 includes a number of information blocks 312 utilized to document the insured club detail. The insured club detail information is entered and maintained in a database by Administrators or account managers. Screen shot 310 also includes a submit button 314 to transmit the inputted information to system 30 (shown in FIG. 2). Screen shot 310 further includes a comment box 316 used to provide comments and notes regarding the insured club detail. In one embodiment, screen shot 310 also includes an edit button 318 utilized to edit a named insured detail page that has previously been completed and sent to system 30 (shown in FIG. 2).

Figure 19:
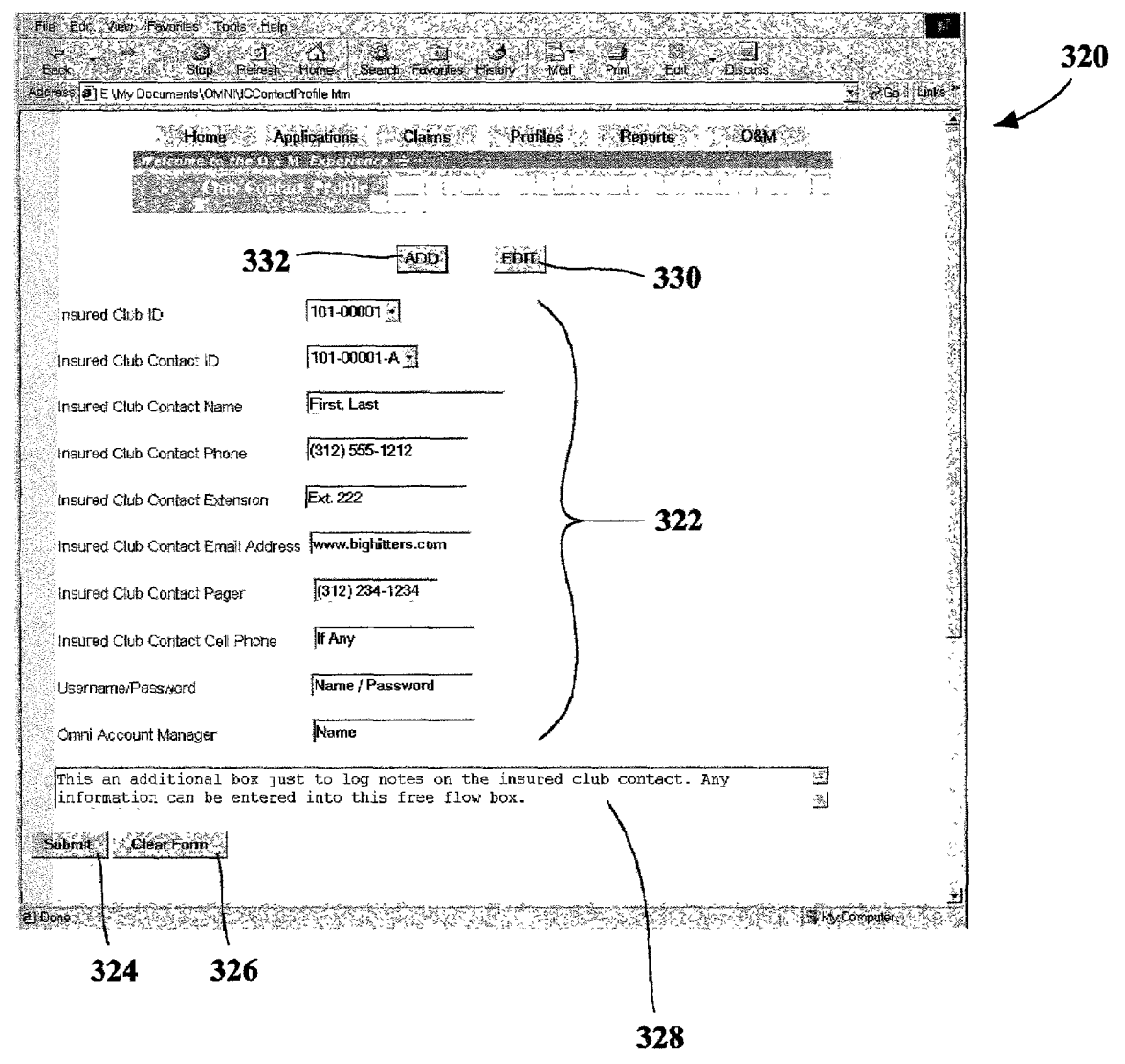

FIG. 19 is an exemplary embodiment of a club contact profile page depicted in screen shot 320. Screen shot 320 includes a number of information blocks 322 utilized to document the named insured contact. The named insured contact information is entered and maintained in a database by Administrators or account managers. Screen shot 320 also includes a submit button 324 to transmit the inputted information to system 30 (shown in FIG. 2). Screen shot 320 also includes a clear form button 326 to clear any information entered into information blocks 322. Screen shot 320 further includes a comment box 328 used to provide comments and notes regarding the insured club contact detail. Screen shot 320 further includes an edit button 330 utilized to edit an insured club contact detail page that has previously been completed and sent to system 30 (shown in FIG. 2). Screen shot 320 still further includes an add button 332 utilized to add another named insured contact page for an existing named insured.

Figure 20:
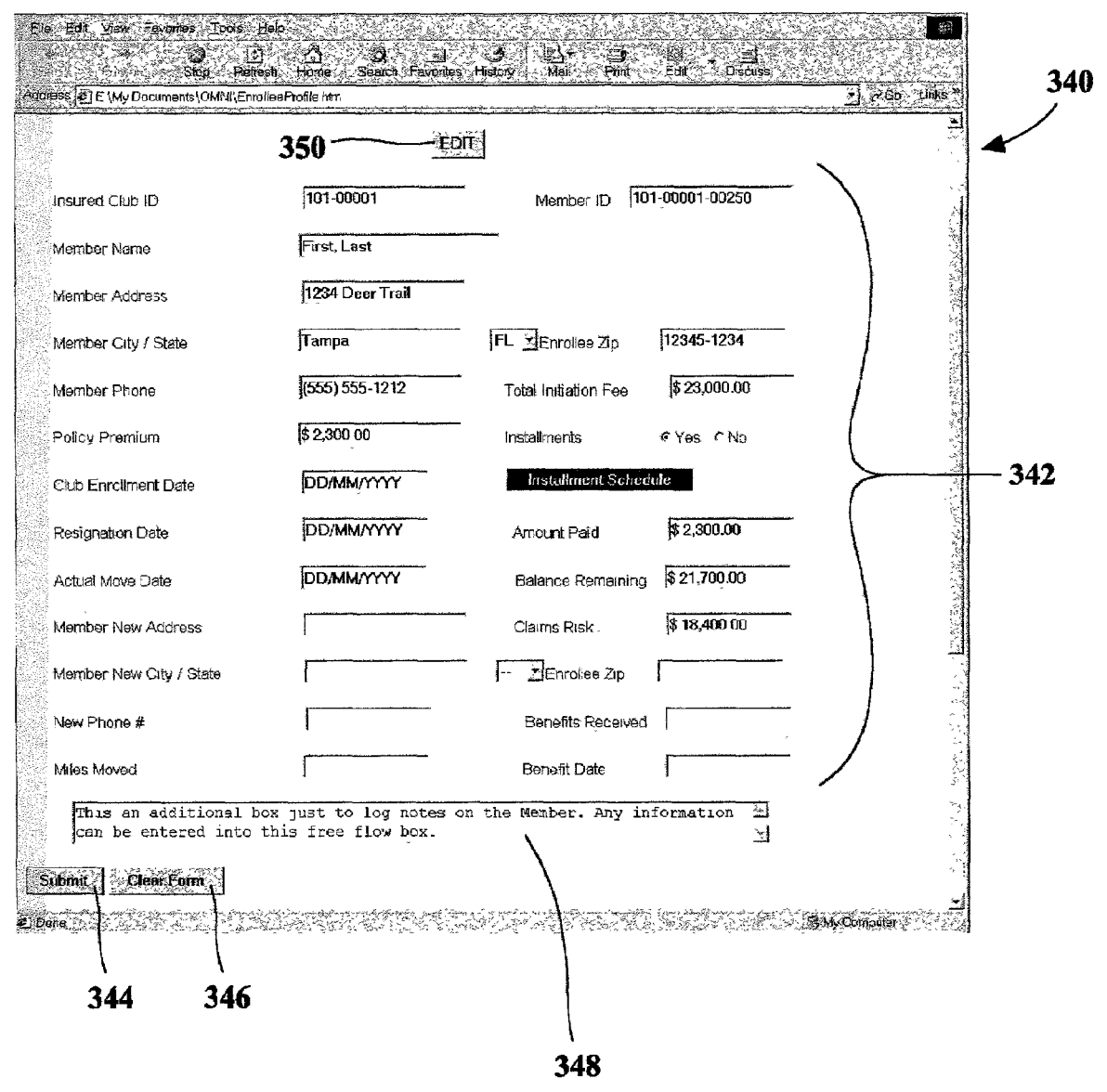

FIG. 20 is an exemplary embodiment of a member profile page depicted in screen shot 340. Screen shot 340 includes a number of information blocks 342 utilized to document the member profile. The member profile information is entered and maintained in a database by Administrators or account managers. Screen shot 340 also includes a submit button 344 to transmit the inputted information to system 30 (shown in FIG. 2). Screen shot 340 also includes a clear form button 346 to clear any information entered into information blocks 342. Screen shot 340 also includes a comment box 348 used to provide comments and notes regarding the member detail. Screen shot 340 further includes an edit button 350 utilized to edit an member profile page that has previously been completed and sent to system 30 (shown in FIG. 2).

Figure 21:
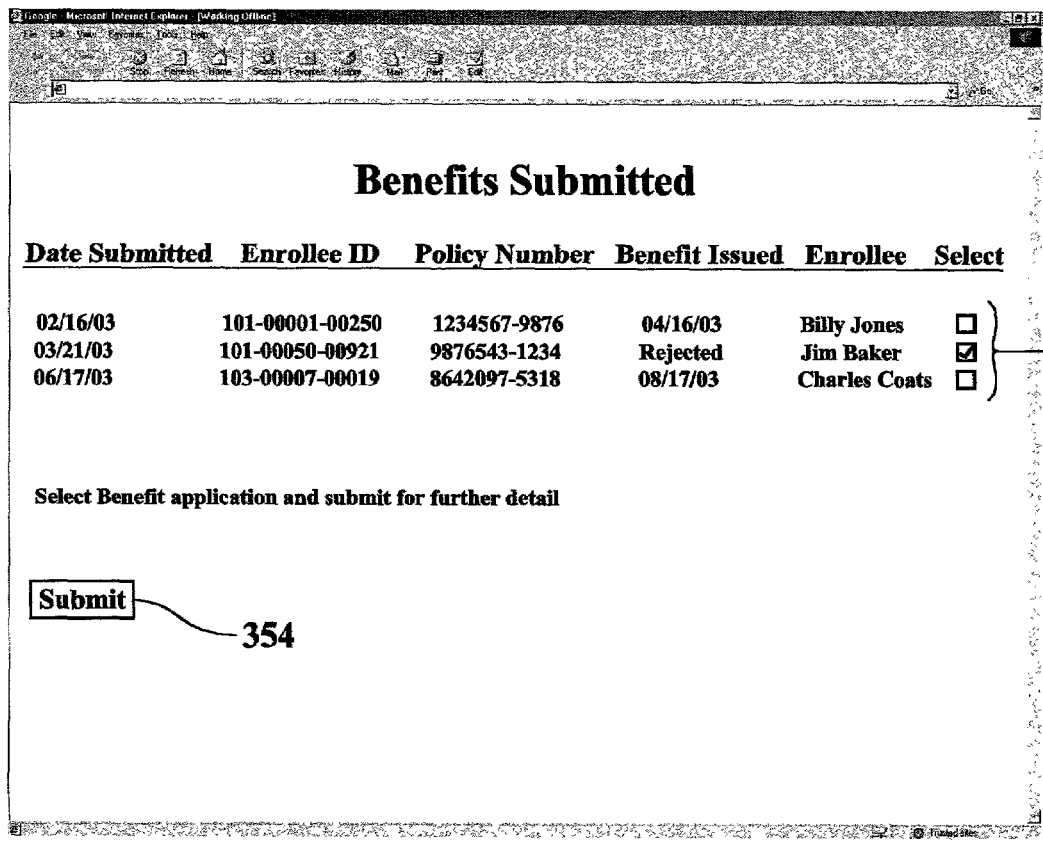
FIG. 21 is an exemplary embodiment of a benefits submitted page.

FIG. 21 is an exemplary embodiment of a benefits submitted page depicted in screen shot 350. Screen shot 350 includes a number of member listings that include information regarding benefits submitted for the particular member. Screen shot 350 also includes a submit button 354 that is utilized to submit the inputted information to system 30 (shown in FIG. 2).

While the invention has been described in terms of various specific embodiments, those skilled in the art will recognize that the invention can be practiced with modification within the spirit and scope of the claims.

What is claimed is:

1. A method for providing insurance coverage by an insurer to insure a club's liability created by resignation of a club member, said method comprising the steps of:
   receiving, by the insurer, information pertaining to the club and a resigning club member;
   receiving, by the insurer, information pertaining to an initiation fee paid by the resigning club member to the club;
   receiving club member resignation information;
   processing, by the insurer, the received information to determine whether the insurer is to pay a club initiation fee insurance benefit to the club to cover a loss of at least a portion of the initiation fee paid by the resigning club member and whether insurance coverage details are to be tracked for the resigning club member;
   authorizing by the insurer the club initiation fee insurance benefit to be paid to the club;
   entering the resigning club member information in a benefits payable database.

2. A method in accordance with claim 1 wherein said step of receiving information pertaining to the club comprises the step of receiving information regarding an insured club profile.

3. A method in accordance with claim 1 further comprising the step of receiving, by the insurer, information pertaining to a named insured.

4. A method in accordance wit claim 3 wherein said step of receiving information pertaining to a named insured comprises the step of receiving information pertaining to a named insured contact.

5. A method in accordance with claim 1 wherein said step of receiving information pertaining to the club comprises the step of receiving information pertaining to an insured club contact.

6. A method in accordance with claim 3 further comprising the step of generating an identification number for the named insured.

7. A method in accordance with claim 3 further comprising the step of establishing a deposit premium for the named insured.

8. A method in accordance with claim 1 further comprising the step of generating an identification number for a named insured.

9. A method in accordance with claim 1 further comprising the step of entering the resigning club member information in a benefits payable database.

10. A method in accordance with claim 1 further comprising the step of paying, by the insurer, an insurance benefit to the club.

11. A method in accordance with claim 1 further comprising the step of processing, by the insurer, the received information to determine whether to approve an insurance benefit payable to a named insured for the initiation fee paid by the resigning club member.

12. A system for implementing an initiation fee insurance program, said system comprising;
   a named insured database;
   an insured club database; and
   a server configured to prompt a user to provide information to an insurer regarding a named insured and an insured club including information pertaining to an initiation fee paid by a resigning club member to the insured club, said server further configured to:
   receive and process the provided information to determine whether the insurer is to pay an initiation fee insurance benefit to the club to cover a loss of at least a portion of the initiation fee paid by the resigning club member and track coverage details for the resigning club member;
   receive club member resignation information;
   receive, by the insurer, information pertaining to an initiation fee paid by the resigning club member to the club;
   receive an authorization, by the insurer, of an initiation fee insurance benefit to be paid by the insurer to the insured club; and
   enter the resigning club member information in a benefits payable database.

13. A system in accordance with claim 12 further comprising a club member database.

14. A system in accordance with claim 12 further comprising a benefits payable database.

15. A method for an insurer to insure a named insured, wherein the named insured is a club, against liability due to a resignation of a club member, said method comprising the steps of:

receiving, by the insurer, information pertaining to the named insured and the club member;

receiving, by the insurer, information pertaining to an initiation fee paid by the club member to the named insured; and processing, by the insurer, the received information to determine whether to pay a club initiation fee insurance benefit of at least a portion of the club member initiation fee to the named insured upon resignation of the club member and track coverage details for the club member;

receiving by the insurer, club member resignation information;

authorizing, by the insurer, the club initiation fee insurance benefit to be paid to the club; and entering the club member resignation information in a benefits payable database.

16. A method in accordance with claim 15 wherein said step of receiving information pertaining to the named insured comprises the step of receiving information pertaining to a named insured contact.

17. A method in accordance with claim 15 further comprising the step of generating an identification number for the named insured.

18. A method in accordance with claim 15 further comprising the step of establishing a deposit premium for the named insured.

19. A method in accordance with claim 15 further comprising the step of generating an identification number for the named insured.

20. A method in accordance with claim 15 further comprising the step of entering the club member information in a benefits payable database.

21. A method in accordance with claim 15 further comprising the step of processing, by the insurer, the received information to determine whether to approve an insurance benefit payable to the named insured upon resignation of the club member for at least a portion of the initiation fee paid by the club member.

22. A method in accordance with claim 15 wherein the named insured is a club, said step of receiving information pertaining to the named insured comprises the step of receiving information regarding an insured club profile.

23. A method in accordance with claim 15 wherein the named insured is a club, said step of receiving information pertaining to the named insured comprises the step of receiving information pertaining to an insured club contact.

24. A method in accordance with claim 15 wherein the named insured is a club, said method further comprising the step of paying, by the insurer, an insurance benefit to the club.

\* \* \* \* \*